(12) United States Patent
Wakabayashi

(10) Patent No.: US 11,815,416 B2
(45) Date of Patent: Nov. 14, 2023

(54) DISPLACEMENT DETECTION DEVICE AND TORQUE SENSOR

(71) Applicant: FANUC CORPORATION, Yamanashi (JP)

(72) Inventor: Kazuki Wakabayashi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/008,227

(22) PCT Filed: Jun. 7, 2021

(86) PCT No.: PCT/JP2021/021475
§ 371 (c)(1),
(2) Date: Dec. 5, 2022

(87) PCT Pub. No.: WO2021/251311
PCT Pub. Date: Dec. 16, 2021

(65) Prior Publication Data
US 2023/0175902 A1    Jun. 8, 2023

(30) Foreign Application Priority Data
Jun. 12, 2020  (JP) ................................ 2020-102337

(51) Int. Cl.
*G01L 3/14*    (2006.01)
(52) U.S. Cl.
CPC ...................... *G01L 3/14* (2013.01)
(58) Field of Classification Search
CPC .................... G01L 3/14; G01L 1/14
See application file for complete search history.

(56) References Cited

U.S. PATENT DOCUMENTS 6,880,408 B1    4/2005  Madden et al.
10,209,151 B2 *  2/2019  Okada ...................... G01L 3/10
(Continued)

FOREIGN PATENT DOCUMENTS

JP    2001272290 A    10/2001
JP    2018200259 A    12/2018
(Continued)

OTHER PUBLICATIONS

International Search Report issued by the Japanese Patent Office acting as the International Searching Authority in relation to International Application No. PCT/JP2021/021475 dated Jul. 6, 2021 (3 pages) along with English language translation (2 pages).
(Continued)

*Primary Examiner* — Freddie Kirkland, III
(74) *Attorney, Agent, or Firm* — Robert P. Michal, Esq.; Carter, DeLuca & Farrell LLP

(57) ABSTRACT

A displacement detection device and a torque sensor include a movable part that is connected to a first member and to a second member and that changes a gap along with displacement of the second member with respect to the first member in a prescribed direction; and a detection part (detection circuit) that, on the basis of the change in the gap detects displacement of the second member with respect to the first member in the prescribed direction, wherein the movable part is configured to make the amount of N change in the gap greater than the amount of displacement of the second member with respect to the first member in the prescribed direction.

11 Claims, 7 Drawing Sheets

(56) References Cited

U.S. PATENT DOCUMENTS

| | | | |
|---|---|---|---|
| 10,416,030 B2* | 9/2019 | Okada | G01L 5/226 |
| 11,499,878 B2* | 11/2022 | Okada | G01L 5/165 |
| 2012/0132467 A1 | 5/2012 | Zeineddine | |
| 2017/0241827 A1 | 8/2017 | Heo et al. | |
| 2018/0209860 A1* | 7/2018 | Okada | G01L 3/1442 |

FOREIGN PATENT DOCUMENTS

| | | |
|---|---|---|
| JP | 2019174477 A | 10/2019 |
| WO | 2018016036 A1 | 1/2018 |

OTHER PUBLICATIONS

Written Opinion of the International Searching Authority issued by the Japanese Patent Office acting as the International Searching Authority in relation to International Application No. PCT/JP2021/021475 dated Jul. 6, 2021 (4 pages).

* cited by examiner

DISPLACEMENT DETECTION DEVICE AND TORQUE SENSOR

CROSS-REFERENCE TO RELATED APPLICATIONS

This application is a national phase entry under 35 U.S.C. 371 of PCT International Application No. PCT/JP2021/021475, filed Jun. 7, 2021, which claims priority to Japanese Patent Application No. 2020-102337, filed Jun. 12, 2020, the disclosure of each of these applications is expressly incorporated herein by reference in their entirety.

TECHNICAL FIELD

The present invention relates to a displacement detection device for detecting a displacement of a second member relative to a first member in a predetermined direction, and a torque sensor including the displacement detection device.

BACKGROUND ART

A movable shaft portion of a collaborative robot is provided with a torque sensor for detecting torque. By providing the torque sensor, the collaborative robot has a contact stop function. In addition, by providing the torque sensor, the collaborative robot can achieve operation of the robot by direct teaching (also referred to as read-through). Types of the torque sensor include a strain gauge type including a strain gauge and a capacitance type including a displacement detection device. JP 2019-174477 A discloses a capacitance-type torque sensor.

SUMMARY OF THE INVENTION

As a method of increasing the sensitivity of the capacitance-type torque sensor, there are a method of narrowing the gap between the opposing electrodes and a method of increasing the area of the opposing electrodes. However, the gap between the opposing electrodes has a lower limit value. On the other hand, when the area of the opposing electrodes is increased, there arises a problem that the size of the entire sensor increases.

In order to address the problem, an object of the present invention is to provide a displacement detection device and a torque sensor capable of increasing detection sensitivity without increasing the size of members used.

A first aspect of the present invention is a displacement detection device configured to detect displacement of a second member relative to a first member in a predetermined direction, the displacement detection device including: a movable portion connected to the first member and the second member and configured to change a gap in accordance with the displacement of the second member relative to the first member in the predetermined direction; and a detection unit configured to detect the displacement of the second member relative to the first member in the predetermined direction, based on a change in the gap, wherein the movable portion is configured to make an amount of the change in the gap larger than an amount of the displacement of the second member relative to the first member in the predetermined direction.

A second aspect of the present invention is a torque sensor including the displacement detection device of the first aspect, the torque sensor further including: an inner ring and an outer ring; and an elastically deformable body connected to the inner ring and the outer ring, wherein in the elastically deformable body, rigidity in a torque direction is smaller than rigidity in directions other than the torque direction, the torque direction being a direction in which the outer ring rotates relative to the inner ring, wherein the inner ring is the first member, and the outer ring is the second member.

According to the present invention, detection sensitivity can be increased without increasing the size of the members used.

DETAILED DESCRIPTION OF THE INVENTION

Preferred embodiments of a displacement detection device and a torque sensor according to the present invention will be described in detail below with reference to the accompanying drawings.

1. First Embodiment

In the following description, three directions of an X direction, a Y direction, and a Z direction are used. The X direction and the Y direction are orthogonal to each other. Further, the Z direction is orthogonal to the X direction and the Y direction.

1-1. Configuration of Displacement Detection Device 10

Figure 1:
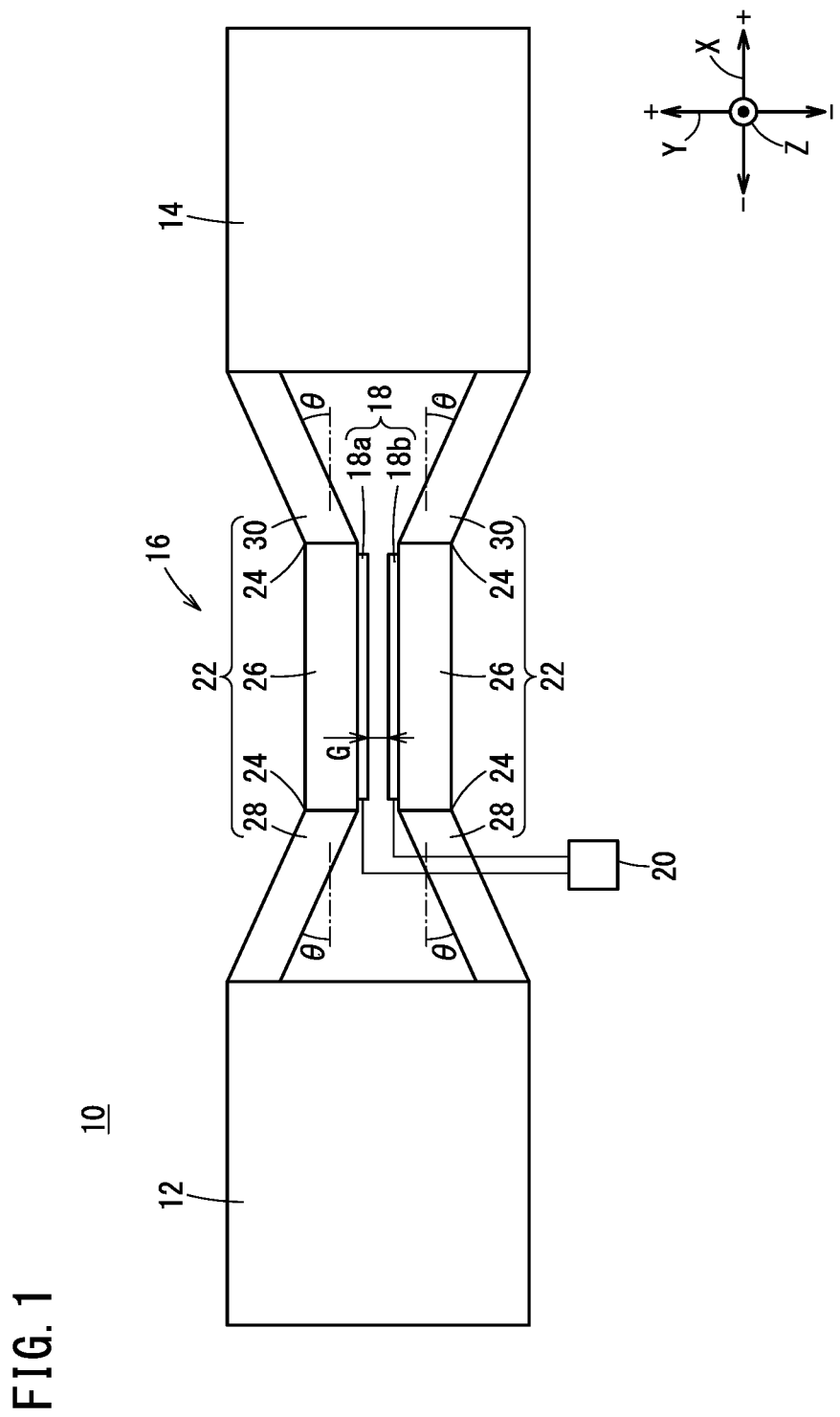
FIG. 1 is a diagram illustrating a configuration of a displacement detection device according to a first embodiment.
Figure 2:
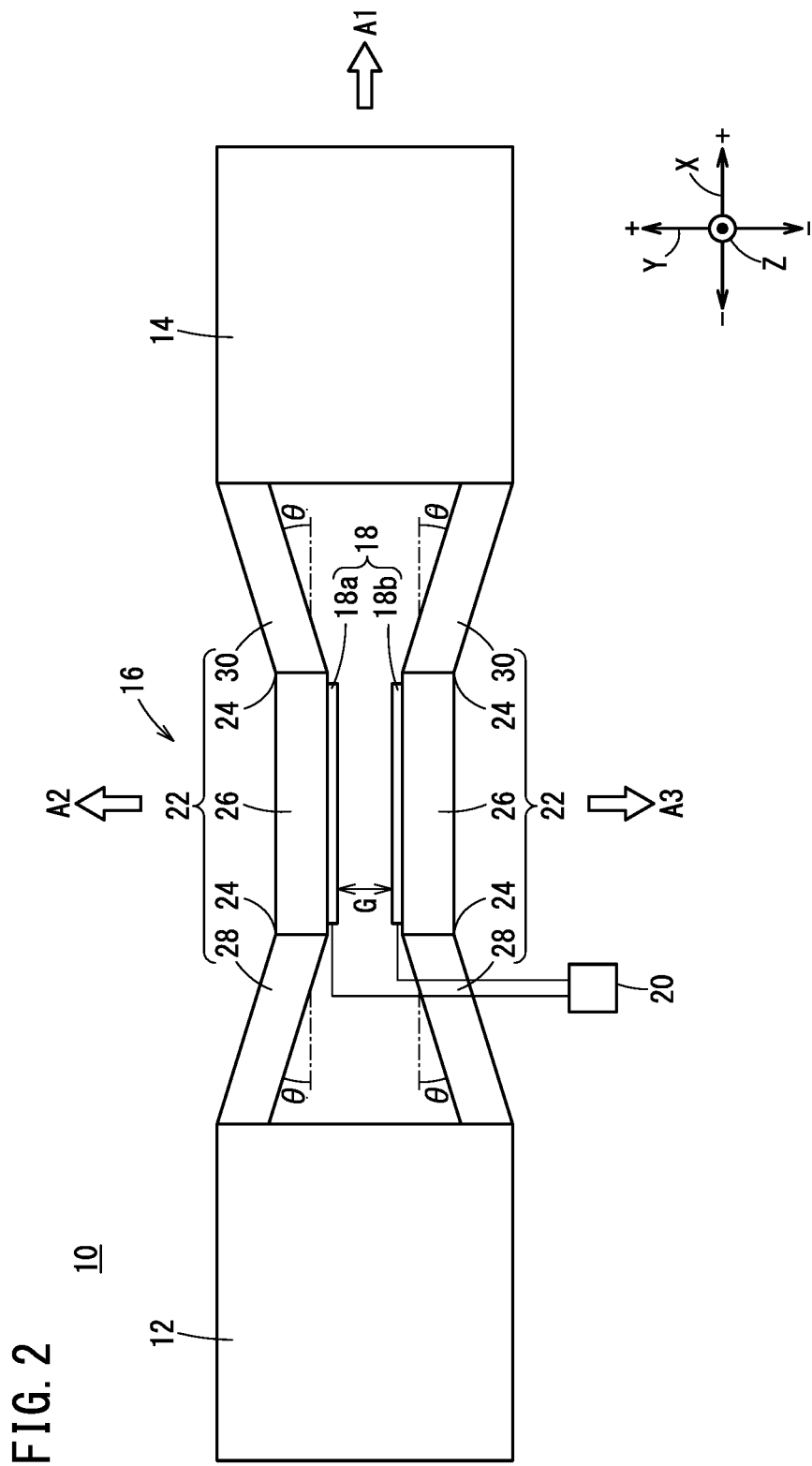
FIG. 2 is a diagram showing the configuration of the displacement detection device according to the first embodiment.

A displacement detection device 10 according to a first embodiment will be described with reference to the drawings. FIGS. 1 and 2 are diagrams illustrating a configuration of the displacement detection device 10 according to the first embodiment. FIG. 1 shows the displacement detection device 10 in a state in which no external force acts on a second member 14. FIG. 2 shows the displacement detection device 10 in a state in which an external force is applied to displace the second member 14 in a predetermined direction. Here, in FIG. 1, the right direction on the paper is defined as a +X direction, the left direction on the paper is defined as a −X direction, the upper direction on the paper is defined as a +Y direction, the lower direction on the paper is defined as a −Y direction, the front-side direction on the paper is defined as a +Z direction, and the back-side direction on the paper is defined as a −Z direction.

The displacement detection device 10 is attached to a target object (not illustrated). The displacement detection device 10 detects deformation of the target object in a predetermined direction (X direction). Further, the displacement detection device 10 detects an external force in a predetermined direction acting on the target object. The displacement detection device 10 includes a first member 12, a second member 14, a movable portion 16, opposing electrodes 18, and a detection circuit (detection unit) 20.

The first member 12 and the second member 14 are attached to the target object. Alternatively, the first member 12 and the second member 14 may be integrally formed with the target object. The second member 14 is disposed in the +X direction when viewed from the first member 12. The movable portion 16 is provided between the first member 12 and the second member 14. The movable portion 16 includes a movable body 22 disposed on the +Y direction side and another movable body 22 disposed on the −Y direction side.

Each movable body 22 includes two bent portions 24, a holding portion 26, a first inclined portion 28, and a second inclined portion 30. The movable body 22 is an elastic member (for example, a plate spring or flat spring). The movable body 22 expands and contracts along the X direction due to elastic deformation of the two bent portions 24. Each bent portion 24 is parallel to the Z-direction. The holding portion 26 is interposed between the two bent portions 24. The holding portion 26 is parallel to the X direction and the Z direction. The holding portion 26 of one movable body 22 and the holding portion 26 of the other movable body 22 hold the opposing electrodes 18. The first inclined portion 28 is interposed between the bent portion 24 located in the −X direction and the first member 12. The first inclined portion 28 is inclined with respect to the X direction. The second inclined portion 30 is interposed between the bent portion 24 located in the +X direction and the second member 14. The second inclined portion 30 is inclined with respect to the X direction. The first inclined portion 28 of the movable body 22 located in the +Y direction is inclined such that a portion farther from the bent portion 24 is located more toward the +Y direction. Similarly, the second inclined portion 30 of the movable body 22 located in the +Y direction is inclined such that a portion farther from the bent portion 24 is located more toward the +Y direction. On the other hand, the first inclined portion 28 of the movable body 22 located in the −Y direction is inclined such that a portion farther from the bent portion 24 is located more toward the −Y direction. Similarly, the second inclined portion 30 of the movable body 22 positioned in the −Y direction is inclined such that a portion farther from the bent portion 24 is located more toward the −Y direction. An initial value of the inclination angle θ of the first inclined portion 28 with respect to the X direction is the same as an initial value of the inclination angle θ of the second inclined portion 30 with respect to the X direction. The initial value of the inclination angle θ is less than 45 degrees. The initial value of the inclination angle θ is an angle when no external force in the X direction acts on the target object.

The opposing electrodes 18 include a pair of electrodes facing each other. The pair of electrodes includes a first electrode 18a and a second electrode 18b. The first electrode 18a is attached to the holding portion 26 of the movable body 22 located in the +Y direction. The first electrode 18a is oriented in the −Y direction. The second electrode 18b is attached to the holding portion 26 of the movable body 22 located in the −Y direction. The second electrode 18b is oriented in the +Y direction. A gap G that can widen and narrow in the Y direction is formed between the first electrode 18a and the second electrode 18b.

The detection circuit 20 is a circuit that applies a predetermined voltage to the opposing electrodes 18 and detects the capacitance value of the opposing electrodes 18. A detection value of the detection circuit 20 is output to an arithmetic device (not illustrated) such as a computer. The arithmetic device stores a table or an arithmetic equation in advance. The table or the arithmetic equation associates the change amount of the capacitance value with the displacement amount of the second member 14 in the predetermined direction (X direction) relative to the first member 12. In addition, the table or the arithmetic equation associates the change amount of the capacitance value with the external force acting in the predetermined direction (X direction).

1-2. Operation of Displacement Detection Device 10

When an external force that deforms the target object in the X direction acts on the target object, the displacement detection device 10 transitions from the state shown in FIG. 1 to the state shown in FIG. 2. The second member 14 is displaced in the +X direction (the direction of arrow A1). As the second member 14 is displaced in the +X direction, the two bent portions 24 of each movable body 22 are elastically deformed. The inclination angle θ of the first inclined portion 28 and the inclination angle θ of the second inclined portion 30 become smaller than the initial value. When the inclination angle θ becomes small, the holding portion 26 of the movable body 22 located on the +Y direction side is displaced in the +Y direction (the direction of arrow A2). Similarly, when the inclination angle θ decreases, the holding portion 26 of the movable body 22 located on the −Y direction side is displaced in the −Y direction (the direction of arrow A3). As a result, the first electrode 18a and the second electrode 18b are displaced, and the gap G between the opposing electrodes 18 widens.

The arithmetic device (not illustrated) calculates the displacement amount of the second member 14 relative to the first member 12 and the external force acting in the displacement direction, based on the capacitance value detected by the detection circuit 20, the table stored in advance, and the like.

1-3. Operation and Effect of Displacement Detection Device 10

In the first embodiment, the movable portion 16 converts movement of the second member 14 being displaced relative to the first member 12 into operation of changing the gap G between the opposing electrodes 18. The direction in which the gap G is changed intersects with the direction in which the second member 14 is displaced. As an example, in the displacement detection device 10 illustrated in FIGS. 1 and 2, the direction (Y direction) in which the gap G changes and the direction (X direction) in which the second member 14 is displaced are orthogonal to each other. Further, the movable portion 16 amplifies the displacement amount of the second member 14 and transmits the amplified displacement amount to the opposing electrodes 18.

According to the first embodiment, the initial value of the inclination angle θ of the first inclined portion 28 and the initial value of the inclination angle θ of the second inclined portion 30 are less than 45 degrees. Therefore, the amount of change in the gap G between the opposing electrodes 18 is larger than the amount of displacement of the second member 14. Further, according to the first embodiment, the two movable bodies 22 displace both the first electrode 18a and the second electrode 18b. Therefore, the amount of change in the gap G is further increased. The fact that the amount of change in the gap G is larger than the amount of displacement of the second member 14 means that the sensitivity of displacement detection is high. That is, according to the first embodiment, the sensitivity of displacement detection can be increased without increasing the size of the member used (the opposing electrodes 18).

Furthermore, in the first embodiment, since the movable body 22 such as a plate spring is used, the detection is unlikely to be affected by an external force acting in a direction other than the X direction. That is, in the first embodiment, the influence of interference with the other axes is small. Therefore, disturbance can be reduced, and the displacement can be detected with high accuracy.

1-4. Modification of First Embodiment

The displacement detection device 10 may include an optical or magnetic distance sensor instead of the opposing electrodes 18.

Further, the movable portion 16 may include only one movable body 22. In this case, for example, the first electrode 18a is attached to the movable body 22. The second electrode 18b is fixed at a position face-to-face with the first electrode 18a.

2. Second Embodiment

Figure 3:
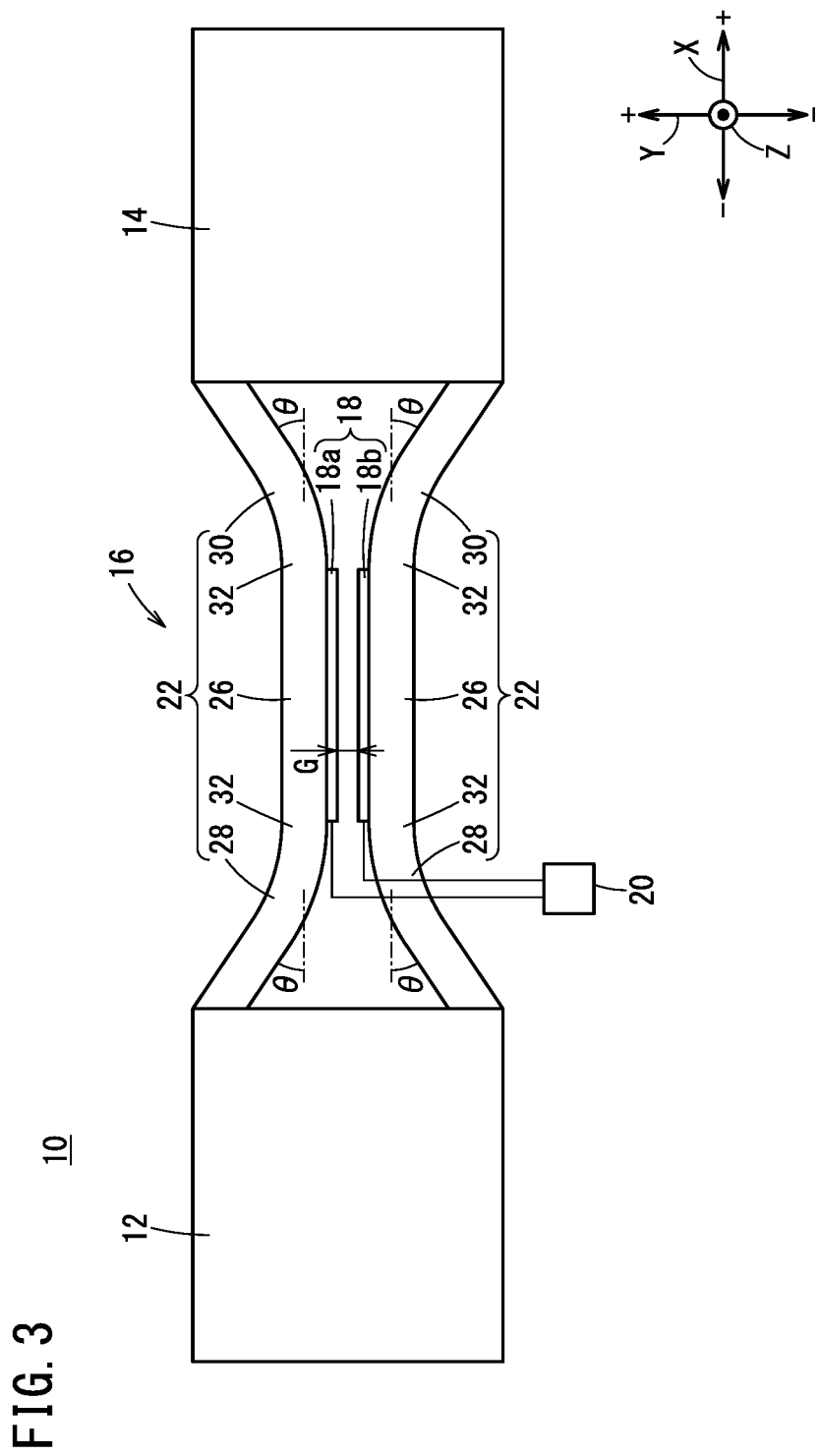
FIG. 3 is a diagram showing a configuration of a displacement detection device according to a second embodiment.

A displacement detection device 10 according to a second embodiment will be described with reference to the drawings. FIG. 3 is a diagram showing a configuration of the displacement detection device 10 according to the second embodiment. FIG. 3 shows the displacement detection device 10 in a state in which no external force acts on the second member 14. In the second embodiment, the same components as those of the first embodiment are denoted by the same reference numerals, and detailed description thereof will be omitted.

In the first embodiment, each movable body 22 is an elastic member having two bent portions 24. Instead of the above, in the second embodiment, each movable body 22 may be an elastic member having two curved portions 32. The second embodiment has the same advantageous effect as the first embodiment. In the second embodiment, the two curved portions 32 are elastically deformed.

As in the first embodiment, the displacement detection device 10 of the second embodiment may include an optical or magnetic distance sensor instead of the opposing electrodes 18. Further, the movable portion 16 may include only one movable body 22.

3. Third Embodiment

3-1. Configuration of Displacement Detection Device 10

Figure 4:
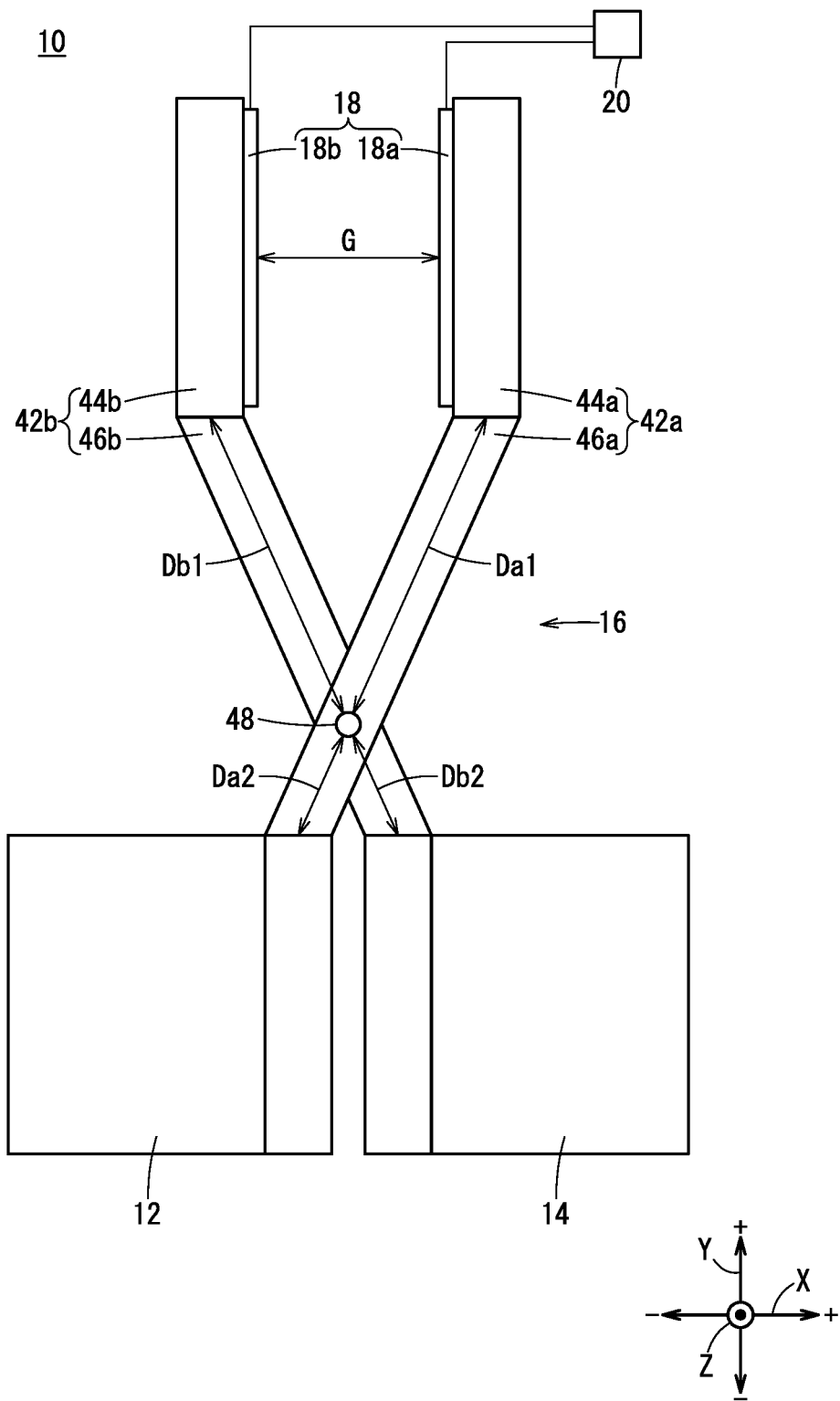
FIG. 4 is a diagram showing a configuration of a displacement detection device according to a third embodiment.
Figure 5:
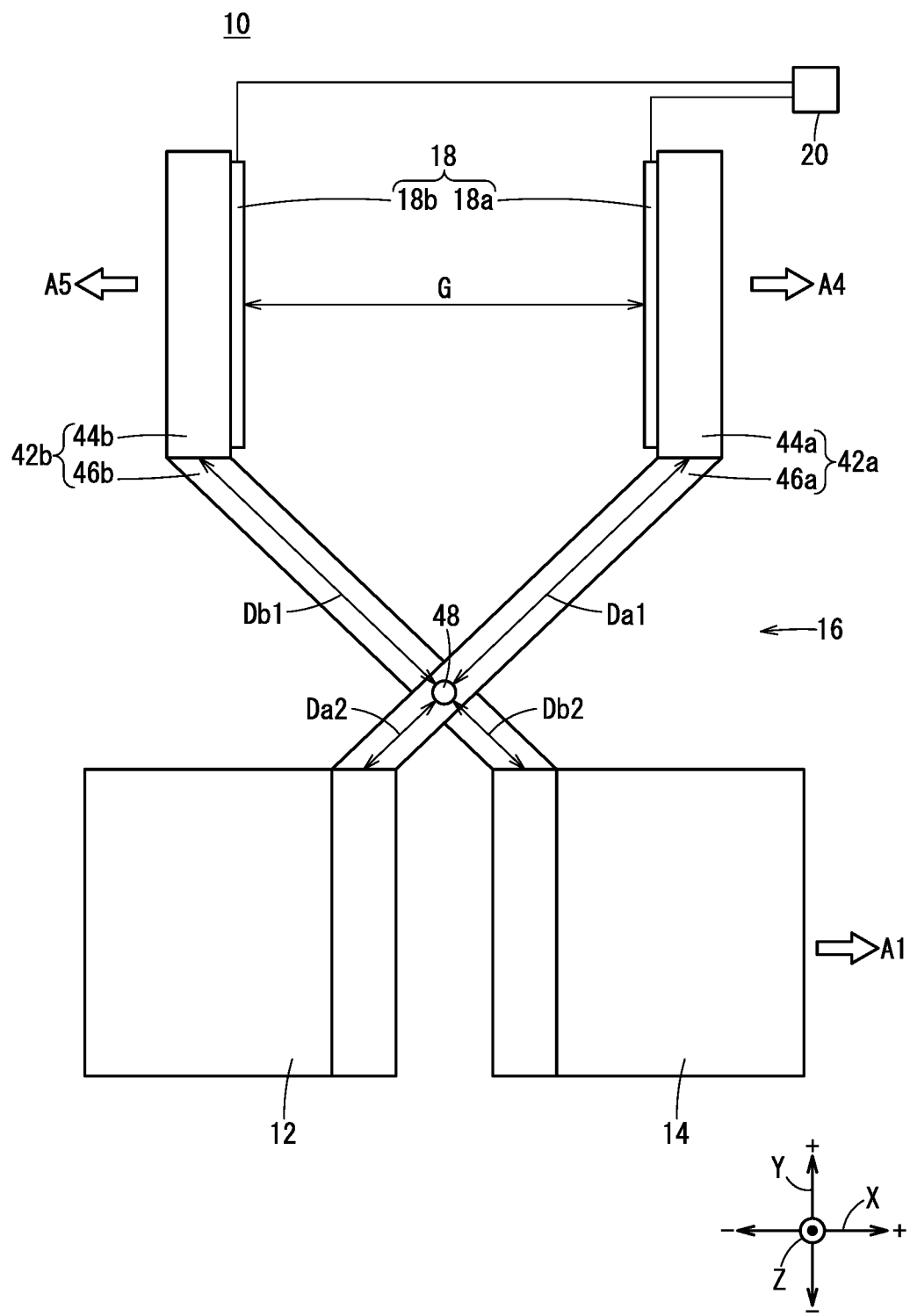
FIG. 5 is a diagram showing the configuration of a displacement detection device according to the third embodiment.

A displacement detection device 10 according to a third embodiment will be described with reference to the drawings. FIGS. 4 and 5 are views showing a configuration of the displacement detection device 10 according to the third embodiment. FIG. 4 shows the displacement detection device 10 in a state in which no external force acts on the second member 14. FIG. 5 shows the displacement detection device 10 in a state in which an external force is applied to displace the second member 14 in a predetermined direction. In the third embodiment, the same components as those of the first embodiment are denoted by the same reference numerals, and detailed description thereof will be omitted. As in the first embodiment, the right direction on the paper is defined as a +X direction, the left direction on the paper is defined as a −X direction, the upper direction on the paper is defined as a +Y direction, the lower direction on the paper is defined as a −Y direction, the front-side direction on the paper is defined as a +Z direction, and the back-side direction on the paper is defined as a −Z direction.

The movable portion 16 according to the third embodiment includes two movable bodies 42a and 42b. One movable body 42a includes a holding portion 44a and a rod portion 46a. The other movable body 42b includes a holding portion 44b and a rod portion 46b.

The holding portion 44a of one movable body 42a is disposed in the +X direction when viewed from the holding portion 44b of the other movable body 42b. The holding portions 44a and 44b hold the opposing electrodes 18. The rod portion 46a and the rod portion 46b intersect with each other at an intermediate point 48. The rod portion 46a and the rod portion 46b are rotary members that are rotatable about an axis that passes through the intermediate point 48 and extends in the Z direction. The rod portion 46a and the rod portion 46b are connected to each other at the intermediate point 48. A first member 12 is swingably connected to one end portion of the rod portion 46a. The holding portion 44a is swingably connected to the other end portion of the rod portion 46a. The intermediate point 48 is provided between the one end portion of the rod portion 46a and the other end portion of the rod portion 46a. The second member 14 is swingably connected to one end portion of the rod portion 46b. The holding portion 44b is swingably connected to the other end portion of the rod portion 46b. The intermediate point 48 is provided between the one end portion of the rod portion 46b and the other end portion of the rod portion 46b. In the rod portion 46a, a distance Da1 from the intermediate point 48 to the holding portion 44a is longer than a distance Da2 from the intermediate point 48 to the first member 12. In the rod portion 46b, a distance db1 from the intermediate point 48 to the holding portion 44b is longer than a distance db2 from the intermediate point 48 to the second member 14. The distances Da1 and db1 are equal to each other. The distances Da2 and db2 are equal to each other.

The first electrode 18a of the opposing electrodes 18 is attached to the holding portion 44a located in the +X direction, and is directed in the −X direction. The second electrode 18b of the opposing electrodes 18 is attached to the holding portion 44b located in the −X direction, and is directed in the +X direction. A gap G that can widen and narrow in the X direction is formed between the first electrode 18a and the second electrode 18b.

3-2. Operation of Displacement Detection Device 10

When an external force that deforms the target object in the X direction acts on the displacement detection device 10, the displacement detection device 10 transitions from the state shown in FIG. 4 to the state shown in FIG. 5. The second member 14 is displaced in the +X direction (the direction of arrow A1). The two holding portions 44a and 44b are displaced along with the displacement of the second member 14 in the +X direction. To be specific, due to the principle of leverage, the holding portion 44a is displaced in the +X direction (the direction of arrow A4), and the holding portion 44b is displaced in the −X direction (the direction of arrow A5). According to the principle of leverage, the intermediate point 48 serves as a fulcrum, the first member 12 and the second member 14 serve as points of effort, and the holding portion 44a and the holding portion 44b serve as points of load. As a result, the first electrode 18a and the second electrode 18b are displaced, and the gap G between the opposing electrodes 18 widens.

The arithmetic device (not illustrated) calculates the displacement amount of the second member 14 relative to the first member 12 and the external force acting in the displacement direction, based on the capacitance value detected by the detection circuit 20, the table stored in advance, and the like.

3-3. Operation and Effect of Displacement Detection Device 10

In the third embodiment, the movable portion 16 converts movement of the second member 14 being displaced relative to the first member 12 into operation of changing the gap G between the opposing electrodes 18. The direction in which the gap G is changed (the X direction) coincides with the direction in which the second member 14 is displaced (the X direction). Further, the movable portion 16 amplifies the displacement amount of the second member 14 and transmits the amplified displacement amount to the opposing electrodes 18.

According to the third embodiment, the distance Da1 is longer than the distance Da2, and the distance db1 is longer than the distance db2. Therefore, the amount of change in the gap G between the opposing electrodes 18 is larger than the amount of displacement of the second member 14. Further, according to the third embodiment, both the first electrode 18a and the second electrode 18b are displaced by the two movable bodies 42a and 42b. Therefore, the amount of change in the gap G is further increased. The fact that the amount of change in the gap G is larger than the amount of displacement of the second member 14 means that the sensitivity of displacement detection is high. That is, according to the third embodiment, the sensitivity of displacement detection can be increased without increasing the size of the member used (the opposing electrodes 18).

Further, according to the third embodiment, a member (elastic member or the like) in which fatigue failure can occur is not used. Therefore, the life time of the movable portion 16 can be extended.

3-4. Modification of Third Embodiment

The movable bodies 42a, 42b may have a displaceable rotary joint equipped with a slider, at the intermediate point 48.

As in the first and second embodiments, the displacement detection device 10 of the third embodiment may include an optical or magnetic distance sensor instead of the opposing electrodes 18.

4. Fourth Embodiment

4-1. Configuration of Torque Sensor 50

Figure 6:
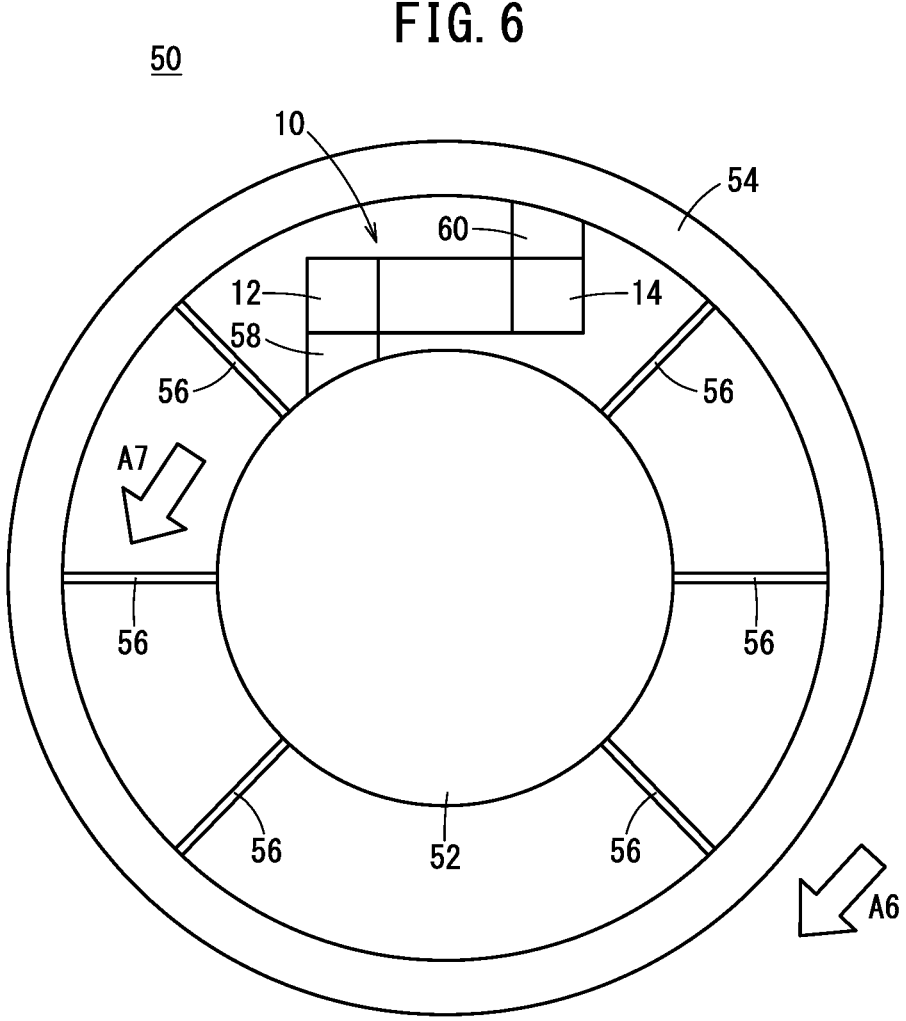
FIG. 6 is a diagram showing a configuration of a torque sensor according to a fourth embodiment.

A torque sensor 50 according to a fourth embodiment will be described with reference to the drawings. FIG. 6 is a view showing a configuration of the torque sensor 50 according to the fourth embodiment. In the fourth embodiment, the same components as those in the first to third embodiments are denoted by the same reference numerals, and detailed description thereof will be omitted.

The torque sensor 50 includes an inner ring 52, an outer ring 54, a plurality of elastically deformable bodies 56, and the displacement detection device 10 according to any one of the first embodiment to the third embodiment. The inner ring 52, the outer ring 54, and the elastically deformable bodies 56 are made of metal, for example. The inner ring 52, the outer ring 54, and the elastically deformable bodies 56 are integrally formed.

The inner ring 52 is a cylinder. The outer ring 54 is a hollow cylinder. The outer ring 54 accommodates the inner ring 52 therein. The axis of the inner ring 52 and the axis of the outer ring 54 are the same. The inner ring 52 rotates relative to the outer ring 54. Further, the outer ring 54 rotates relative to the inner ring 52. Thus, the inner ring 52 and the outer ring 54 can be displaced relative to each other. A first attachment portion 58 protruding toward the outer ring 54 is formed on an outer peripheral surface of the inner ring 52. A second attachment portion 60 protruding toward the inner ring 52 is formed on an inner peripheral surface of the outer ring 54.

Each of the elastically deformable bodies 56 is a beam formed between the inner ring 52 and the outer ring 54. The elastically deformable body 56 is formed along the radial direction of the outer ring 54. One end of the elastically deformable body 56 is connected to the outer peripheral surface of the inner ring 52. The other end of the elastically deformable body 56 is connected to the inner peripheral surface of the outer ring 54. The elastically deformable body 56 has high rigidity in the axial direction and the radial direction of the inner ring 52 and the outer ring 54. In addition, the elastically deformable body 56 has low rigidity in the circumferential direction of the inner ring 52 and the outer ring 54. Therefore, the elastically deformable bodies 56 are less likely to be deformed in the axial direction and the radial direction. The elastically deformable bodies 56 are elastically deformed in accordance with rotation of the inner ring 52 or the outer ring 54.

The displacement detection device 10 is connected to the inner ring 52 and the outer ring 54. The first member 12 of the displacement detection device 10 is connected to the first attachment portion 58. Alternatively, the first member 12 itself may be the first attachment portion 58. The second member 14 of the displacement detection device 10 is connected to the second attachment portion 60. Alternatively, the second member 14 itself may be the second attachment portion 60. The posture of the displacement detection device 10 is not limited. For example, the direction in which the gap G between the opposing electrodes 18 (FIGS. 1 to 5) changes may coincide with the axial direction of the inner ring 52 and the axial direction of the outer ring 54.

The arithmetic device (not illustrated) stores a table or an arithmetic equation in advance. The table or the arithmetic equation associates the change amount of the capacitance value of the displacement detection device 10 with the displacement amount of the outer ring 54 relative to the inner ring 52 in the circumferential direction. In addition, the table or the arithmetic equation associates the change amount of the capacitance value of the displacement detection device 10 with the torque acting in the circumferential direction.

4-2. Operation of Torque Sensor 50

When the inner ring 52 is fixed and torque in a predetermined direction (direction of arrow A6) acts on the outer ring 54, the outer ring 54 rotates about the inner ring 52. In response to this rotation, the second member 14 of the displacement detection device 10 is displaced relative to the first member 12. Then, as described in [1-2] and [3-2] above, the gap G between the opposing electrodes 18 widens.

The arithmetic device (not illustrated) calculates the displacement amount of the second member 14 relative to the first member 12 and the torque acting on the outer ring 54, based on the capacitance value detected by the detection circuit 20, the table stored in advance, and the like.

On the other hand, when the outer ring 54 is fixed and the torque in a predetermined direction (the direction indicated by arrow A7) acts on the inner ring 52, the arithmetic device (not shown) similarly calculates the amount of displacement of the second member 14 relative to the first member 12 and the torque acting on the inner ring 52.

4-3. Operation and Effect of Torque Sensor 50

In the fourth embodiment, the torque sensor 50 includes the displacement detection device 10 according to any one of the first to third embodiments. Therefore, according to the fourth embodiment, the same advantageous effects as those of the first to third embodiments can be obtained. Further, the elastically deformable bodies 56 connecting the inner ring 52 and the outer ring 54 have low rigidity in the circumferential direction of the inner ring 52 and the outer ring 54. Therefore, the torque sensor 50 can detect the torque with high sensitivity.

According to the fourth embodiment, in the displacement detection device 10, the inner ring 52, the outer ring 54, and the elastically deformable bodies 56 are separate members. Therefore, the displacement detection device 10 can be designed flexibly regardless of the structures of the inner ring 52, the outer ring 54, and the elastically deformable bodies 56. Therefore, the displacement detection device 10 can be manufactured at low cost.

4-4. Modification of Fourth Embodiment

Figure 7:
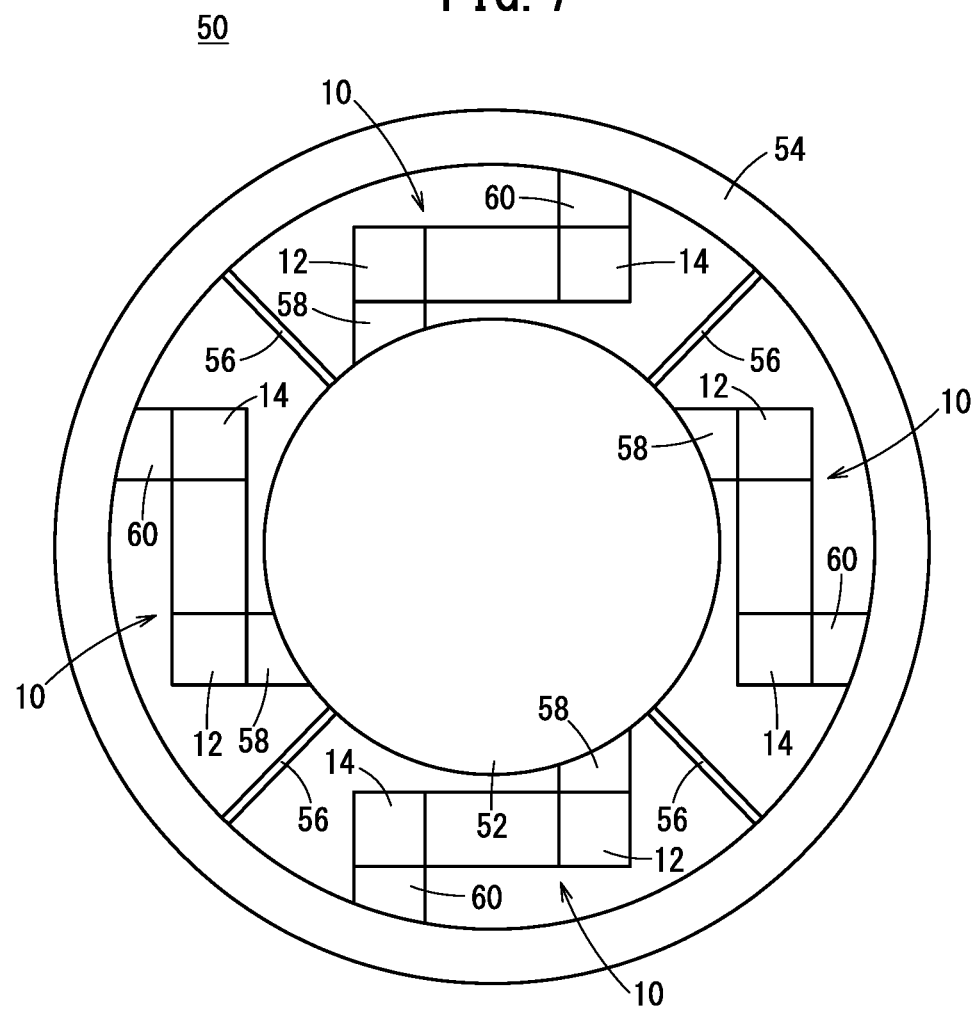
FIG. 7 is a diagram showing a configuration of a modification of the fourth embodiment.

The torque sensor 50 may include a plurality of displacement detection devices 10. In this case, the plurality of displacement detection devices 10 may be arranged along the circumferential direction of the inner ring 52 (and the outer ring 54). Alternatively, the plurality of displacement detection devices 10 may be arranged along the axial direction of the inner ring 52 (and the outer ring 54). In the torque sensor 50 shown in FIG. 7, four displacement detection devices 10 are arranged at intervals of 90 degrees along the circumferential direction. In a case where the plurality of displacement detection devices 10 are arranged along the axial direction of the inner ring 52 (and the outer ring 54), the plurality of displacement detection devices 10 may be connected to the same first attachment portion 58 and the same second attachment portion 60.

According to the modification using the plurality of displacement detection devices 10, for example, the influence of disturbance can be reduced by averaging the detection values. Thus, an accurate torque can be calculated. Further, according to this modification, by providing a plurality of equivalent torque detection systems, it is possible to perform multiple checking of a failure.

5. Invention Obtained from Embodiments

Inventions that can be grasped from the above-described embodiments and the modifications thereof will be described below.

A first aspect of the present invention is the displacement detection device (10) configured to detect displacement of the second member (14) relative to the first member (12) in a predetermined direction, the displacement detection device (10) including: the movable portion (16) connected to the first member and the second member and configured to change the gap (G) in accordance with displacement of the second member relative to the first member in the predetermined direction; and the detection unit (20) configured to detect the displacement of the second member relative to the first member in the predetermined direction, based on the change in the gap. The movable portion is configured to make the amount of the change in the gap larger than the amount of the displacement of the second member relative to the first member in the predetermined direction.

The first aspect of the invention may further include the two movable bodies (22, 42a, 42b) included in the movable portion; and the pair of opposing electrodes (18) including the first electrode (18a) attached to one of the movable bodies and the second electrode (18b) attached to another of the movable bodies and facing the first electrode, the pair of opposing electrodes forming the gap between the first electrode and the second electrode. The detection unit may be the detection circuit configured to detect the displacement of the second member relative to the first member in the predetermined direction, based on a change in the capacitance value of the opposing electrodes caused by the change in the gap.

In the first aspect of the present invention, each of the movable bodies (22) may be an elastic member having the bent portion (24) or the curved portion (32), and the gap may be changed by elastic deformation of the bent portion or the curved portion.

In the first aspect of the invention, each of the movable bodies may include: the holding portion (26) that is interposed between the two bent portions and is parallel to the predetermined direction, the holding portion being configured to hold the first electrode or the second electrode; the first inclined portion (28) interposed between one of the bent portions and the first member and inclined with respect to the predetermined direction; and the second inclined portion (30) interposed between another of the bent portions and the second member and inclined with respect to the predetermined direction. The bent portions may be elastically deformed in accordance with the displacement of the second member relative to the first member in the predetermined direction, and the inclination angle (θ) of the first inclined portion with respect to the predetermined direction and the inclination angle (θ) of the second inclined portion with respect to the predetermined direction may be changed, whereby the gap may be changed.

In the first aspect of the present invention, the inclination angle of the first inclined portion and the inclination angle of the second inclined portion with respect to the predetermined direction may be less than 45 degrees.

In the first aspect of the present invention, the direction in which the gap changes may intersect with the predetermined direction.

In the first aspect of the present invention, the two movable bodies (42a, 42b) may be two rotary members that intersect with each other at an intermediate point (48) and that are rotatably connected to each other at the intermediate point. The first member may be connected to one end portion of one of the movable bodies (42a), and the first electrode may be attached to another end portion of the one movable body. The distance (Da1) from the intermediate point to the first electrode may be longer than the distance (Da2) from the intermediate point to the first member. The second member may be connected to one end portion of another of the movable bodies (42b), and the second electrode may be attached to another end portion of the other movable body. The distance (db1) from the intermediate point to the second electrode may be longer than the distance (db2) from the intermediate point to the second member. The gap may change according to the principle of leverage in which the intermediate point serves as a fulcrum, the first member and the second member serve as points of effort, and the first electrode and the second electrode serve as points of load.

In the first aspect of the present invention, the direction in which the gap changes may coincide with the predetermined direction.

A second aspect of the present invention is the torque sensor (50) including the displacement detection device of the first aspect, the torque sensor further including: the inner ring (52) and the outer ring (54); and the elastically deformable body (56) connected to the inner ring and the outer ring, wherein in the elastically deformable body, rigidity in a torque direction is smaller than rigidity in directions other than the torque direction, the torque direction being a direction in which the outer ring rotates relative to the inner ring. The inner ring is the first member, and the outer ring is the second member.

In the second aspect of the present invention, the direction in which the gap changes may coincide with the axial direction of the inner ring and the outer ring.

In the second aspect of the present invention, the displacement detection device may be provided separately from the inner ring, the outer ring, and the elastically deformable body.

It should be noted that the displacement detection device and the torque sensor according to the present invention are not limited to the above-described embodiments and modifications, and various configurations can be adopted without departing from the essence and gist of the present invention.

The invention claimed is:

1. A displacement detection device configured to detect displacement of a second member relative to a first member in a predetermined direction, the displacement detection device comprising:
   a movable portion connected to the first member and the second member and configured to change a gap in accordance with the displacement of the second member relative to the first member in the predetermined direction; and
   a detection unit configured to detect the displacement of the second member relative to the first member in the predetermined direction, based on a change in the gap,
   wherein
   the movable portion is configured
       to make an amount of the change in the gap larger than an amount of the displacement of the second member relative to the first member in the predetermined direction,
       to make the gap larger as the first member and the second member separate from each other, and
       to make the gap smaller as the first member and the second member come close to each other.

2. The displacement detection device according to claim 1, further comprising:
   two movable bodies included in the movable portion; and
   a pair of opposing electrodes including a first electrode attached to one of the movable bodies and a second electrode attached to another of the movable bodies and facing the first electrode, the pair of opposing electrodes forming the gap between the first electrode and the second electrode,
   wherein the detection unit is a detection circuit configured to detect the displacement of the second member relative to the first member in the predetermined direction, based on a change in a capacitance value of the opposing electrodes caused by the change in the gap.

3. The displacement detection device according to claim 2, wherein
   each of the movable bodies is an elastic member including bent portions or curved portions, and
   the gap is changed by elastic deformation of the bent portions or the curved portions.

4. The displacement detection device according to claim 3, wherein each of the movable bodies includes:
   a holding portion that is interposed between two of the bent portions and is parallel to the predetermined direction, the holding portion being configured to hold the first electrode or the second electrode;
   a first inclined portion interposed between one of the bent portions and the first member and inclined with respect to the predetermined direction; and
   a second inclined portion interposed between another of the bent portions and the second member and inclined with respect to the predetermined direction, and
   wherein the bent portions are elastically deformed in accordance with the displacement of the second member relative to the first member in the predetermined direction, and an inclination angle of the first inclined portion and an inclination angle of the second inclined portion with respect to the predetermined direction are changed, whereby the gap is changed.

5. The displacement detection device according to claim 4, wherein
   the inclination angle of the first inclined portion and the inclination angle of the second inclined portion with respect to the predetermined direction are less than 45 degrees.

6. The displacement detection device according to claim 1, wherein
   a direction in which the gap changes intersects with the predetermined direction.

7. The displacement detection device according to claim 2, wherein
   the two movable bodies are two rotary members that intersect with each other at an intermediate point and that are rotatably connected to each other at the intermediate point,
   the first member is connected to one end portion of the one of the movable bodies, the first electrode is attached to another end portion of the one movable body, and a distance from the intermediate point to the first electrode is longer than a distance from the intermediate point to the first member,
   the second member is connected to one end portion of the other of the movable bodies, the second electrode is attached to another end portion of the other movable body, and a distance from the intermediate point to the second electrode is longer than a distance from the intermediate point to the second member, and
   the gap changes according to a principle of leverage in which the intermediate point serves as a fulcrum, the first member and the second member serve as points of effort, and the first electrode and the second electrode serve as points of load.

8. The displacement detection device according to claim 7, wherein
a direction in which the gap changes coincides with the predetermined direction.

9. A torque sensor comprising the displacement detection device according to claim 1, the torque sensor further comprising:
an inner ring and an outer ring; and
an elastically deformable body connected to the inner ring and the outer ring, wherein in the elastically deformable body, rigidity in a torque direction is smaller than rigidity in directions other than the torque direction, the torque direction being a direction in which the outer ring rotates relative to the inner ring,
wherein the inner ring is the first member, and
the outer ring is the second member.

10. The torque sensor according to claim 9, wherein
a direction in which the gap changes coincides with an axial direction of the inner ring and the outer ring.

11. The torque sensor according to claim 9, wherein
the displacement detection device is provided separately from the inner ring, the outer ring, and the elastically deformable body.

* * * * *